United States Patent [19]
Grandbert et al.

[11] Patent Number: 5,764,760
[45] Date of Patent: Jun. 9, 1998

[54] TELEPHONE SET COMPRISING A ROTATING COVER

[75] Inventors: Anthony Grandbert, Allonnes; Philippe Alix, Le Mans, both of France

[73] Assignee: U.S. Philips Corporation, New York, N.Y.

[21] Appl. No.: 754,659

[22] Filed: Nov. 21, 1996

[30] Foreign Application Priority Data

Nov. 29, 1995 [FR] France .................... 95 14129

[51] Int. Cl.$^6$ ........................................ H04M 1/00
[52] U.S. Cl. .............................. 379/433; 379/434
[58] Field of Search ........................ 379/433, 428, 379/434; 455/90, 575; 16/261, 262, 263, 254–256, 277, 278, 303

[56] References Cited

FOREIGN PATENT DOCUMENTS

WO9318592  9/1993  WIPO ............... H04B 1/08

*Primary Examiner*—Jack Chiang
*Attorney, Agent, or Firm*—Dicran Halajian

[57] ABSTRACT

This telephone set comprises:
- a main body (10) on which a keypad (4) is provided,
- a rotating cover (12) intended to conceal the keypad (4),
- a hinge assembly (20) for permitting the rotation of the cover, comprising:
  - a tubular part (26) formed around a fulcrum pin, integral with the cover,
  - a locking spring (45) inserted into the tubular part,
  - two inner pins (50 and 51) inserted into said tubular part (26),
  - two fixed elements (22 and 24) integral with said main body for determining the fulcrum axis,
  - two additional pins (63 and 65) received by the fixed elements.

6 Claims, 5 Drawing Sheets

TELEPHONE SET COMPRISING A ROTATING COVER

FIELD OF THE INVENTION

The invention relates to a telephone set comprising:
a main body and a part that can be covered,
a rotating cover which is capable of adopting various positions in one of which the part that can be covered is concealed,
a hinge assembly for permitting the rotation, around a fulcrum axis, of said cover, this hinge assembly comprising:
  a tubular part formed around said fulcrum axis, integral with said cover,
  a spring element inserted into the tubular part and having two bearing faces,
  two inner pins provided for insertion into said tubular part, having each a blocking element for being in unison with rotation movements of said cover, a supporting face for being in contact with one of the bearing faces of said spring element, and a cam face,
  two fixed elements integral with said main body for determining said fulcrum axis.

The invention also relates to a rotating cover assembly suitable for telephone sets.

BACKGROUND OF THE INVENTION

Such a telephone set is described in Patent Specification PCT WO 93/18592.

A first problem posed by this known set is caused by the fact that a pivot is to be provided on the fixed element. This pivot has a diameter which is smaller as the hinge assembly is to have smaller dimensions, which may affect its robustness. Another problem comes from the protuberance which is always fixed inside this fixed element to form the cam system which determines the opening of the cover. This protuberance does not seem to be easy to form in a molding process.

The invention proposes a telephone set of the type defined in the opening paragraph which does not have the drawbacks of the prior art.

SUMMARY OF THE INVENTION

Therefore, such a telephone set is characterized in that the hinge assembly further comprises:
  two additional pins having an end received by said fixed elements and which have each two faces: one cam face for forming a cam movement in cooperation with said cam faces of said inner pins, and one supporting face received by the two fixed elements.

BRIEF DESCRIPTION OF THE DRAWINGS

These and other aspects of the invention are apparent from and will be elucidated with reference to the embodiments described hereinafter.

In the drawings.

DESCRIPTION OF PREFERRED EMBODIMENTS

Figure 1:
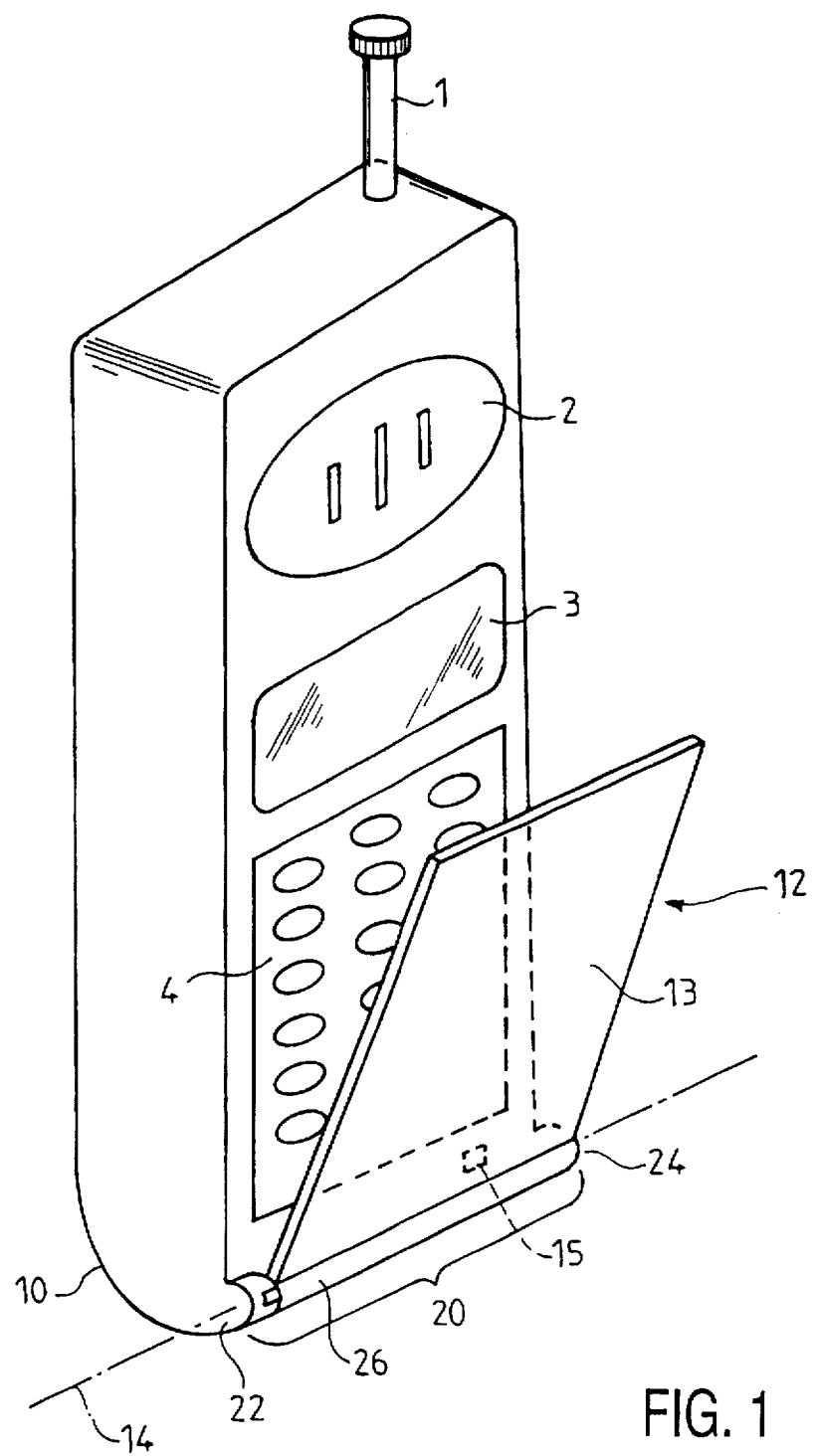
FIG. 1 shows a mobile telephone set according to the invention.

FIG. 1 shows a mobile telephone set according to the invention. The references 1, 2, 3 and 4 respectively show the elements customary for such a set, that is to say: the aerial, the loudspeaker/receiver, the display and the keypad, all this installed in a housing body 10. For protecting its keypad against inappropriate manipulation when the set is not used, a cover 12 is abutted over the keypad 4. In FIG. 1 the cover 12 is represented in a half-open position. This cover 12 comprises a protective part 13 which is to conceal the keypad 4 when the cover is in closed position and which is furthermore used as a folding screen for guiding the sound waves from the speaker's mouth to the microphone 15 when the cover is in a normal open position. This is obtained by rotation around a fulcrum axis 14. The microphone 15 shown in a dashed line in the Figure is located close to the fulcrum axis 14. The cover 12 is connected to the housing 10 by a hinge assembly 20. In FIG. 1, two fixed elements 22 and 24 of this assembly 20 are shown which act as a bearing and a tubular part 26 which forms part of the cover 12.

Figure 2:
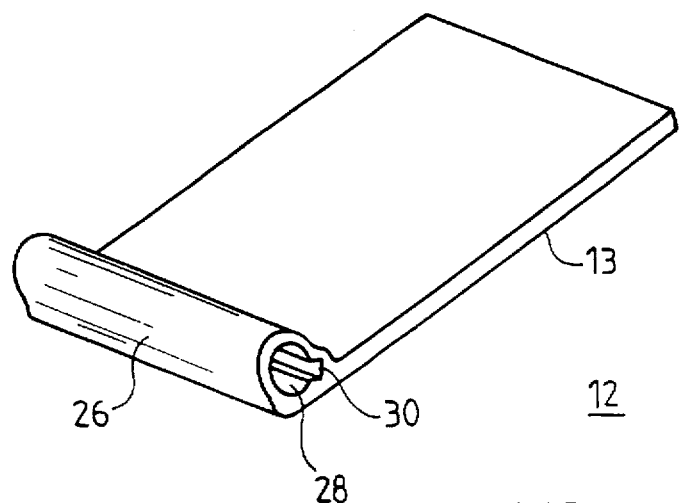
FIG. 2 shows, in perspective view, a rotating cover which forms part of the set shown in FIG. 1.

FIG. 2 shows the construction of this cover 12. Like elements to those of FIG. 1 carry like references. This FIG. 2 further shows in detail the tubular part 26. This part 26 is passed right through by an opening 28 in which a groove 30 is provided.

Figure 3:
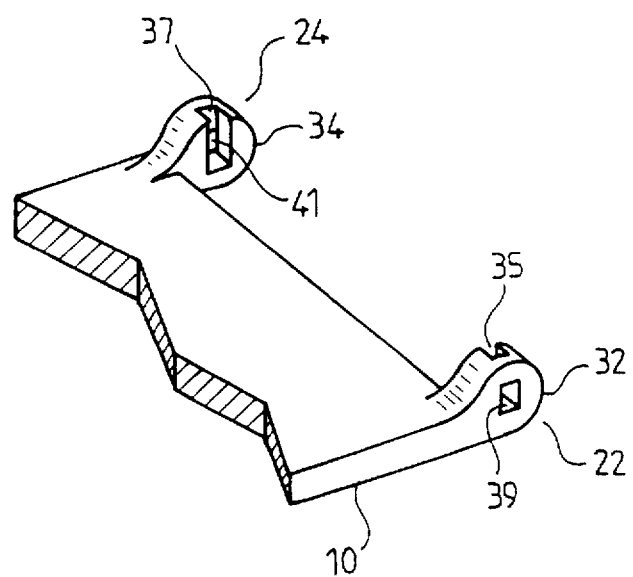
FIG. 3 shows the fixed part of the hinge assembly connected to the housing of the set of FIG. 1.

FIG. 3 shows in more detail the fixed elements 22 and 24. They are formed, respectively, by solid parts 32 and 34 affixed to the cover 10. These solid parts have grooves 35 and 37 respectively, and openings 39 and 41 preferably of rectangular form which run through and through.

Figure 4:
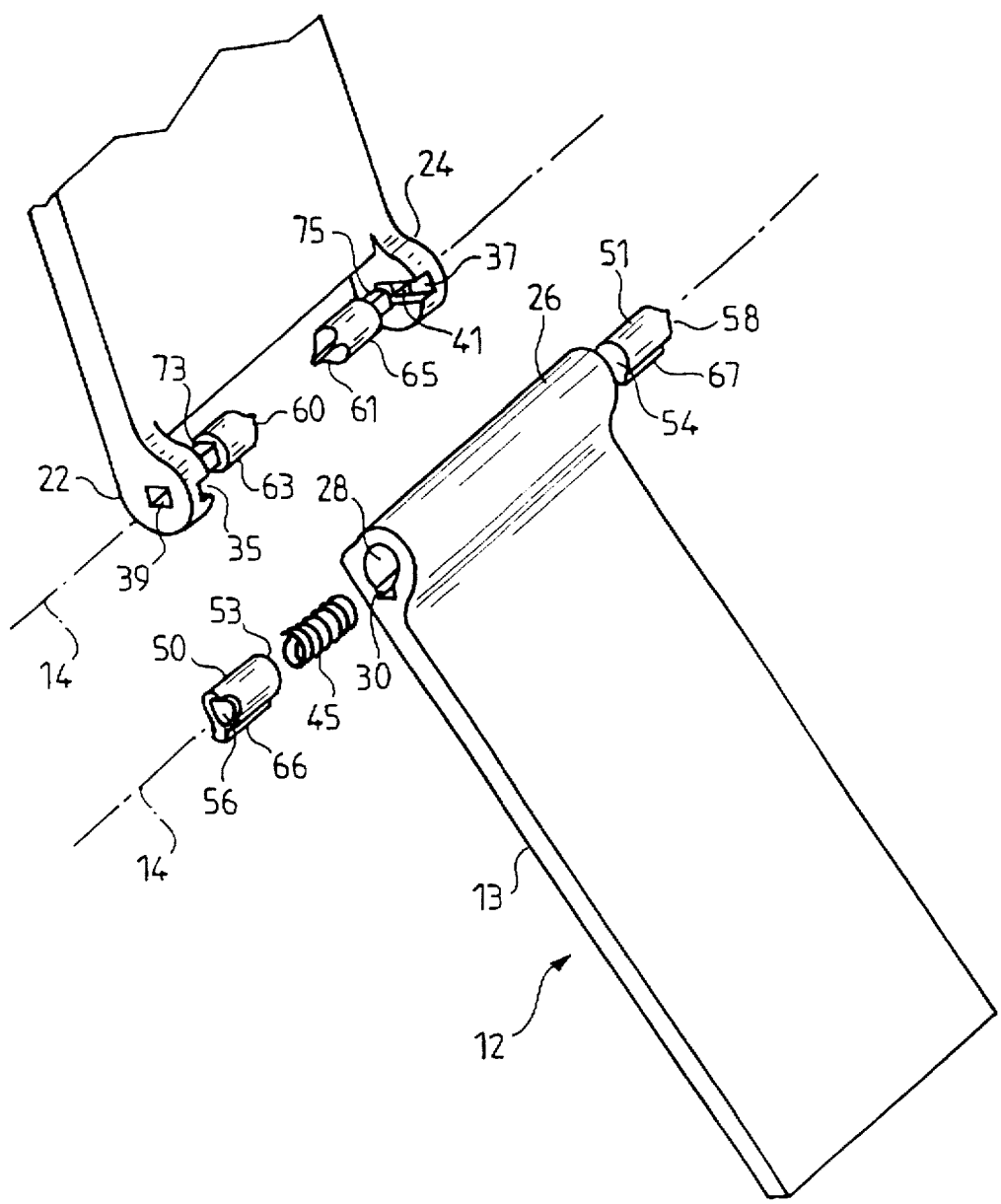
FIG. 4 shows the elements which form part of the hinge assembly.

FIG. 4 shows all the constituent parts of the hinge assembly 20 in a cut-away view. Like elements to those of the preceding Figures carry like references. A spring element 45, preferably a helical locking spring, is provided to be inserted into the opening 28 of the tubular part. On either one of the two sides of this spring element, two inner pins 50 and 51 are provided to be inserted too, at least partly, into this opening 28. These pins have two faces:
  one face 53, 54 respectively which supports the spring element 45, and
  one face called cam face 56, 58 respectively, intended to cooperate with the cam face 60 and 61 respectively, of additional pins 63 and 65. The pins 50 and 51 have each a guide 66 and 67 which slides into the recess 30 so as to form one part with the cover 12 when the guide is inserted into the opening 28. The additional pins have two faces:
  said cam face 60 and 61 cooperating with a cam face 56 and 58 of the inner pins 50 and 51, to form a cam system,
  a supporting face 73 and 75 intended for integrating them with the fixed elements 22 and 24.

These supporting faces glide into the recesses 35 and 37 upon mounting and under the pressure of the spring element 45 are housed in the openings 39 and 41.

Figure 5:
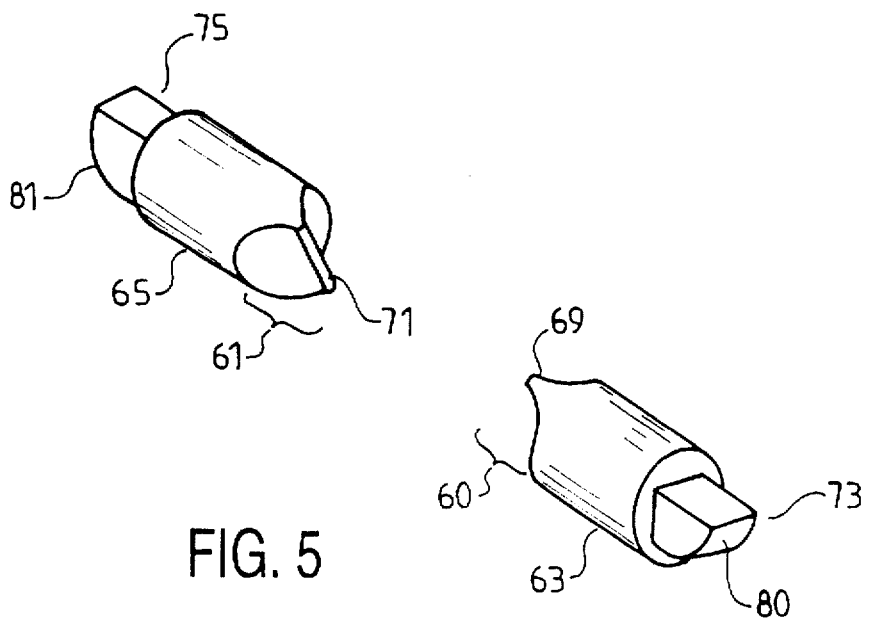
FIG. 5 shows the additional pins which form part of the hinge assembly.

FIG. 5 shows in more detail the construction of the additional pins 63 and 65. In this Figure there may be observed that the cam faces 60 and 61 are shown in the form of a single boss 69 and 71 and that the supporting faces 73 and 75 have a rounded part 80 and 81 of rectangular section to facilitate the insertion of the pins into the hinge assembly 20 before insertion into the openings 39 and 41.

Figure 6:
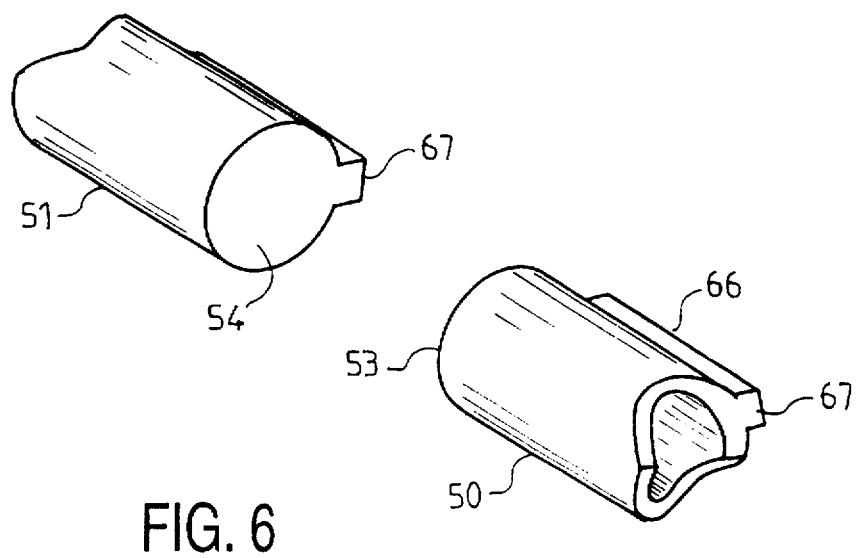
FIG. 6 shows the inner pins which form part of the hinge assembly.
Figure 7A:
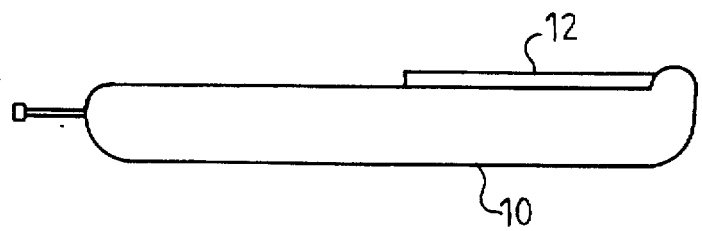
FIGS. 7A–7D show the various degrees of opening of the cover.
Figure 7B:
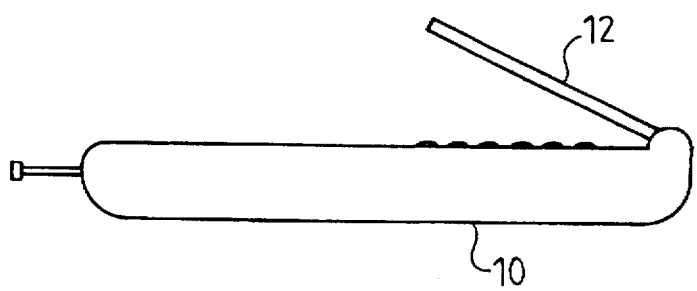
Figure 7C:
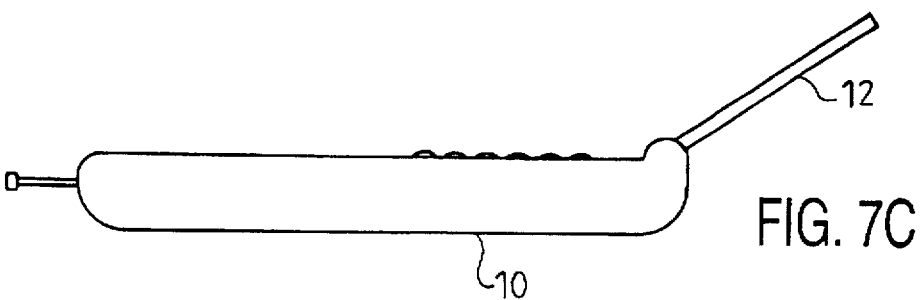
Figure 7D:
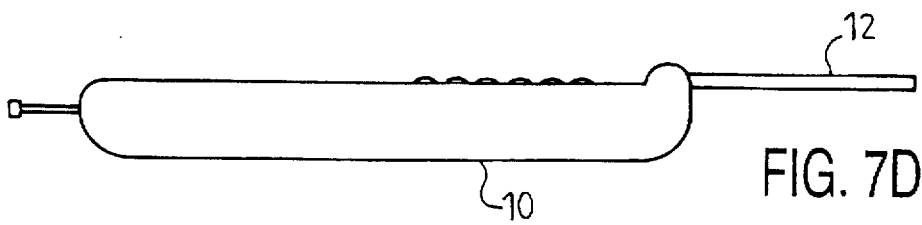

FIG. 6 shows in more detail the construction of the inner pins 50 and 51. In this Figure there may be observed that the profile of the cam face, which is designed according to the state of the art for obtaining the opening positions explained in FIG. 7.

A in this FIG. 7 shows the closed position of the cover on the telephone set.

B shows a limit position for an angle between 20° and 50°, which permits a spontaneous opening up to a desired angle of around 160°, shown in C.

Furthermore, a desired position of 180° shown in D in the Figure can be useful for putting the set on a flat surface with its face against this surface.

We claim:

1. A telephone set comprising:

a main body having a part that can be covered, a rotating cover which is capable of adopting various positions in one of which the part that can be covered is concealed, a hinge assembly for permitting rotation of said cover around a fulcrum axis, this hinge assembly comprising:
   a tubular part formed around said fulcrum axis, integral with said cover,
   a spring element in the tubular part and having two bearing faces,
   two inner pins within said tubular part, each of said inner pins having a blocking element for preventing rotation movements of said inner pins with respect to said cover, a supporting face for contact with one of the bearing faces of said spring element, and a cam face, and
   two fixed elements integral with said main body for determining said fulcrum axis, characterized in that the hinge assembly further comprises:
   two additional pins within said tubular part, said additional pins each having a cam face at one end thereof for forming a cam movement in cooperation with a respective one of said cam faces of said inner pins, and a supporting face at an opposite end thereof, and
   an opening in each of said fixed elements for receiving a respective one of said supporting faces and preventing rotation movements of said additional pins with respect to said main body.

2. A rotating cover assembly suitable for telephone sets, characterized in that the assembly comprises:

a housing, a rotating cover which is capable of adopting various positions, a hinge assembly for permitting rotation of said cover around a fulcrum axis, this hinge assembly comprising:
   a tubular part formed around said fulcrum axis,
   a spring element in the tubular part and having two bearing faces,
   two inner pins within said tubular part, each of said inner pins having a blocking element for preventing rotation movements of said inner pins with respect to said cover, a supporting face for contact with one of the bearing faces of said spring element, and a cam face,
   two fixed elements integral with said housing for determining said fulcrum axis, and
   two additional pins within said tubular part, said additional pins each having a cam face at one end thereof for forming a cam movement in cooperation with a respective one of said cam faces of said inner pins, and a supporting face at an opposite end thereof, and
   an opening in each of said fixed elements for receiving a respective one of said supporting faces and preventing rotation movements of said additional pins with respect to said housing.

3. A rotating cover assembly as claimed in claim 2, characterized in that the supporting faces of the additional pins have a rounded surface for facilitating their insertion into a groove recessed in the fixed elements.

4. A rotating cover assembly as claimed in claim 2 characterized in that the cam faces are provided for obtaining various degrees of opening of the cover:

a folded position, a limited position for spontaneous opening up to the desired position, a normal position, a 180° position.

5. A rotating cover assembly as claimed in claim 2, wherein said additional pins have a cross sectional shape at said opposite end thereof which matches the cross sectional shape of the openings of said fixed elements and said openings of said fixed elements receive said opposite ends of said additional pins to prevent rotation movements of said additional pins with respect to said fixed elements.

6. A rotating cover assembly as claimed in claim 2, wherein said additional pins have a square cross sectional shape at said opposite end thereof which matches a square cross sectional shape of the openings of said fixed elements so that said openings of said fixed elements receive said opposite ends of said additional pins and thereby prevent rotation movements of said additional pins with respect to said fixed elements.

* * * * *